United States Patent
Atlas et al.

(10) Patent No.: US 8,903,242 B2
(45) Date of Patent: Dec. 2, 2014

(54) DIRECTIONLESS AND COLORLESS RECONFIGURABLE OPTICAL ADD/DROP MULTIPLEXER

(75) Inventors: Dogan Atlas, Johns Creek, GA (US); Xiaoping Wu, Norcross, GA (US)

(73) Assignee: ADVA Optical Networking, SE, Meiningen OT Dreissigacker (DE)

( * ) Notice: Subject to any disclaimer, the term of this patent is extended or adjusted under 35 U.S.C. 154(b) by 494 days.

(21) Appl. No.: 12/845,502

(22) Filed: Jul. 28, 2010

(65) Prior Publication Data

US 2012/0027408 A1 Feb. 2, 2012

(51) Int. Cl.
*H04J 14/00* (2006.01)
*H04J 14/02* (2006.01)

(52) U.S. Cl.
CPC ......... *H04J 14/0212* (2013.01); *H04J 14/0217* (2013.01); *H04J 14/021* (2013.01); *H04J 14/0221* (2013.01); *H04J 14/0205* (2013.01); *H04J 14/022* (2013.01); *H04J 14/0204* (2013.01)
USPC ............. 398/83; 398/43; 398/45; 398/48; 398/49; 398/66; 398/67; 398/68; 398/79; 398/82

(58) Field of Classification Search
CPC .............. H04J 14/0201; H04J 14/0202; H04J 14/0204; H04J 14/0205; H04J 14/0206; H04J 14/021; H04J 14/0212; H04J 14/0213; H04J 14/0216; H04J 14/0217
See application file for complete search history.

(56) References Cited

U.S. PATENT DOCUMENTS

| | | | | |
|---|---|---|---|---|
| 5,181,134 | A * | 1/1993 | Fatehi et al. | 398/56 |
| 6,229,827 | B1 * | 5/2001 | Fernald et al. | 372/20 |
| 2002/0191247 | A1 * | 12/2002 | Lu et al. | 359/124 |
| 2004/0028319 | A1 * | 2/2004 | Ajgaonkar et al. | 385/16 |
| 2004/0208546 | A1 | 10/2004 | Alaimo | |
| 2008/0181605 | A1 | 7/2008 | Palacharla | |
| 2009/0232497 | A1 * | 9/2009 | Archambault et al. | 398/50 |
| 2010/0124391 | A1 | 5/2010 | Feuer | |

OTHER PUBLICATIONS

Extended European Search Report for Application No. 10195477.4 dated Jan. 25, 2013.

* cited by examiner

*Primary Examiner* — Darren E Wolf (74) *Attorney, Agent, or Firm* — Jenkins, Wilson, Taylor & Hunt, P.A.

(57) ABSTRACT

The invention relates to a directionless and colorless reconfigurable optical add/drop multiplexer (ROADM) for a number of clients comprising:
an add/drop interface for optical signals of at least one optical network,
wherein each received optical signal is split by at least one optical splitter into optical signals which are applied to a downstream cross connector distributing the split optical signals to wavelength selectors of different clients,
wherein each wavelength selector performs a wavelength selection of at least one wavelength from the distributed optical signals,
wherein an optical signal having a selected wavelength ($\lambda$) is applied to a client transponder of a client.

19 Claims, 6 Drawing Sheets

DIRECTIONLESS AND COLORLESS RECONFIGURABLE OPTICAL ADD/DROP MULTIPLEXER

TECHNICAL BACKGROUND

The invention relates to a directionless and colorless reconfigurable optical add/drop multiplexer and to a method for dropping and adding an optical signal with a selectable wavelength at different clients.

In optical networks it is well known to use reconfigurable optical add/drop multiplexers (ROADMs). A reconfigurable optical add/drop multiplexer (ROADM) is a device that can add, drop, block, pass, equalize or redirect light waves of various wavelengths in a fiber optical network. Such ROADMs can be used in optical systems that transport, add, drop and/or redirect wavelength division multiplexed (WDM) signals. A ROADM allows wavelength selective switching without an optical to electrical or electrical to optical conversion. Outgoing wavelength can be generated in an add operation and an incoming wavelength can be terminated in a drop operation. A light wave can also be passed through the reconfigurable optical add/drop multiplexer without modification in a cut through operation. The ROADM is an optical add/drop multiplexer which provides the ability to remotely switch data traffic of a WDM system at the wavelength layer.

The reconfigurable optical add/drop multiplexer ROADM can be implemented in a conventional way by so-called wavelength selective switching WSS or by a planar lightwave circuit PLC devices. A M×1 WSS uses free-space optics using lenses, mirrors, Grating in conjunction with an optical beam processing device such as MEMS, Liquid Crystal, Digital Light Processing mirror pixels, and Liquid Crystal on Silicon pixels. A M×S WSS can be formed using one or more sets of the optical beam processing devices listed above. An M×1 WSS is used to form a line ROADM in optical network applications. When wavelength add/drop is necessary for a particular channel a light beam at the original wavelength is filtered out and its data extracted. Then, the data is impressed onto a light beam of same or another wavelength. Traffic can be re-directed to any direction when several line ROADMs are used. However, the add/drop functionality is localized (add/drop on the same direction only). However, there is a need for a centralized add/drop to any and every directions. In OFC 2008 Peter Roorda, "Evolution to Colorless and Directionless ROADM Architectures" a directionless and colorless ROADM has been proposed. However, this directionless and colorless ROADM has the disadvantage that once a wavelength is added or dropped from one direction it is blocked from being added or dropped to other directions. Accordingly, there is a need to overcome these limitations and to provide a ROADM which allows true optical branching for an optical network.

SUMMARY OF THE INVENTION

The invention provides a directionless and colorless reconfigurable optical add/drop multiplexer for a number of clients comprising
an add/drop interface for optical signals of at least one optical network,
wherein each received optical signal is split by at least one optical splitter into optical signals which are applied to a downstream cross connector distributing the split optical signals to wavelength selectors of different clients,
wherein each wavelength selector performs a wavelength selection of at least one wavelength from the distributed optical signals,
wherein an optical signal having a selected wavelength is applied to a client transponder of a client.

With the directionless and colorless reconfigurable optical add/drop multiplexer according to the present invention any wavelength can be added or dropped to any network directions.

In a possible embodiment of the directionless and colorless reconfigurable optical add/drop multiplexer according to the present invention the optical add/drop multiplexer is adapted to connect said ROADM to a number (M) of optical networks (also known as optical line networks).

In a still further embodiment of the directionless and colorless reconfigurable optical add/drop multiplexer (ROADM) there are provided M passive (1×R) optical splitters, wherein each passive (1×R) optical splitter is adapted to split an optical signal received from an optical network via said add/drop interface in several (R) optical signals.

In a possible embodiment the split optical signal provided by such a passive (1×R) optical splitter is applied to one of M passive (1×N) optical splitters, wherein each of these passive (1×N) optical splitters is adapted to split the already split optical signal received from the passive (1×R) optical splitter into several (N) optical signals applied to a (M×N) downstream cross connector.

In a possible embodiment the downstream cross connector distributes the split optical signals to N (M×1) wavelength selectors of N different clients, wherein each (M×1) wavelength selector is connected to a corresponding client transponder of a client.

In an alternative embodiment the downstream cross connector distributes the split optical signals to N(M×S) wavelength selectors of N×S different clients, wherein each (M×S) wavelength selector is connected to several (S) client transponders of a group of clients.

In an alternative embodiment the M passive (1×R) optical splitters can be omitted. In this embodiment only M passive (1×N) optical splitters are provided.

In a possible embodiment of the directionless and colorless reconfigurable optical add/drop multiplexer (ROADM) the client comprises a client terminal.

In a further possible embodiment of the directionless and colorless reconfigurable optical add/drop multiplexer (ROADM) the client comprises a client network.

In a possible embodiment of the directionless and colorless reconfigurable optical add/drop multiplexer (ROADM) an optical signal received by the add/drop interface is amplified by an optical amplifier to compensate for losses caused by prior and/or following optical splitters.

In a further possible embodiment of the directionless and colorless reconfigurable optical add/drop multiplexer (ROADM) the split optical signals split by an optical splitter are amplified by optical amplifiers to compensate for losses caused by the optical splitter.

In a possible embodiment of the directionless and colorless reconfigurable optical add/drop multiplexer (ROADM) the wavelength selector can comprise a wavelength selective switch WSS.

In still a further embodiment of the directionless and colorless reconfigurable optical add/drop multiplexer (ROADM) the wavelength-selective switch WSS is a channelized wavelength-selective switch. The channelized wavelength-selective switch comprises a fixed center frequency and a fixed passband bandwidth which is not variable.

In an alternative embodiment of the directionless and colorless reconfigurable optical add/drop multiplexer (ROADM) the wavelength-selective switch WSS is a non-channelized (gridless) wavelength-selective switch having a variable granularity. The gridless wavelength-selective switch comprises a variable center frequency and a variable passband bandwidth.

In a still further embodiment of the directionless and colorless reconfigurable optical add/drop multiplexer (ROADM) each wavelength selector comprises a (M×1) whitelight switch and a (1×1) wavelength-selective switch WSS.

In an alternative embodiment of the directionless and colorless reconfigurable optical add/drop multiplexer (ROADM) each wavelength selector comprises a (M×1) whitelight switch and a tunable filter.

In a possible embodiment of the tunable filter can comprise a liquid crystal filter.

In a further embodiment the tunable filter can comprise a thin film filter.

In a still further embodiment the tunable filter can comprise a MEMS and a grating filter.

In a still further embodiment the tunable filter can comprise a Liquid Crystal on Silicon (LCoS) and a grating filter.

In a still further embodiment the tunable filter can comprise a Digital Light Processing (DLP) and a grating filter.

In a possible embodiment of the directionless and colorless reconfigurable optical add/drop multiplexer (ROADM) each client transponder is connected to a corresponding (1×M) optical switch switching an optical signal transmitted by the client transponder to an upstream cross connector distributing the transmitted optical signals to M optical combiners connected to said optical add/drop interface.

In a still further embodiment of the directionless and colorless reconfigurable optical add/drop multiplexer (ROADM) the downstream cross connector and the upstream cross connector are passive hardwired devices.

In an alternative embodiment of the directionless and colorless reconfigurable optical add/drop multiplexer (ROADM) the downstream cross connector and the upstream cross connector are formed by programmable devices.

In a further embodiment of the directionless and colorless reconfigurable optical add/drop multiplexer (ROADM) the number (M) of optical networks is within a range between one to eight.

In a further possible embodiment of the directionless and colorless reconfigurable optical add/drop multiplexer (ROADM) the number of optical networks can be more than eight optical networks.

In a possible embodiment of the directionless and colorless reconfigurable optical add/drop multiplexer (ROADM) the number N of client transponders is within a range between one and ninety-six client transponders.

In an alternative embodiment the directionless and colorless reconfigurable optical add/drop multiplexer (ROADM) comprises more than ninety-six client transponders.

In a possible embodiment of the directionless and colorless reconfigurable optical add/drop multiplexer (ROADM) the optical signal is transmitted in a predetermined frequency band. The preferred embodiment the frequency band can be in a range between 1528 nm and 1568 nm. In an alternative embodiment the frequency band is a range beyond 1528 nm and 1568 nm.

The invention further provides a directionless and colorless reconfigurable optical add/drop multiplexer (ROADM) for a number of clients comprising:

an add/drop interface for optical signals of at least one optical network, wherein each optical signal is split by at least one optical splitter into optical signals which are applied to at least one contentionless downstream (M×S) wavelength selective switch switching the split optical signals to client transponders of S different clients.

The downstream (M×S) wavelength selective switch is contentionless which means the same wavelength from different client networks can be added/dropped simultaneously, in any order, add/drop port location, on demand and without colliding thus avoiding contention.

This directionless and colorless reconfigurable optical add/drop multiplexer ROADM reduces equipment complexity. Furthermore equipment space is reduced and insertion loss lowered thus improving performance and providing more power to the transponders.

In a possible embodiment of this directionless and colorless reconfigurable optical add/drop multiplexer (ROADM) the contentionless downstreams (M×S) wavelength selective switch is a directionless, colorless and non-blocking wavelength selective switch.

The invention further provides a method for dropping an optical signal with a selectable wavelength at different clients comprising the steps of:
splitting the optical signal into several optical signals;
distributing the split optical signals to wavelength selectors of all clients;
performing a wavelength selection of the distributed optical signals and applying an optical signal having the selected wavelength to a client.

BRIEF DESCRIPTION OF FIGURES

In the following embodiments of the directionless and colorless reconfigurable optical add/drop multiplexer (ROADM) and of a method for dropping an optical signal with a selectable wavelength at different clients are described with reference to the enclosed figures.

DETAILED DESCRIPTION OF POSSIBLE EMBODIMENTS

FIGS. 1 to 5 show possible embodiments of the directionless and colorless reconfigurable optical add/drop multiplexer (ROADM) according to the present invention.

Figure 1:
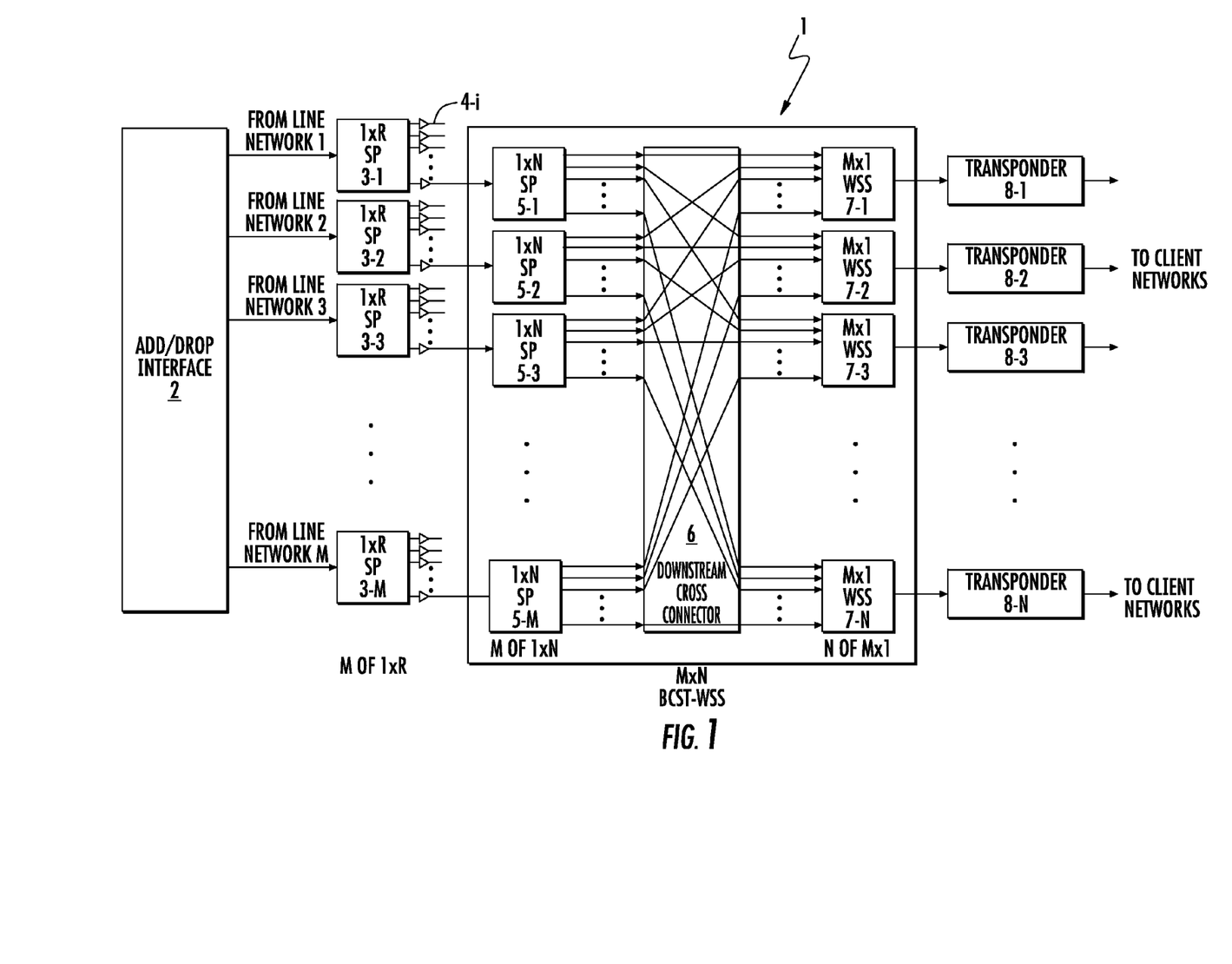
FIG. 1 shows a block diagram of a first possible embodiment of a directionless and colorless reconfigurable optical add/drop multiplexer according to the present invention.

As can be seen from FIG. 1 the add/drop multiplexer ROADM 1 comprises an add/drop interface 2 for optical signals of at least one optical line network. In the shown embodiment there are provided M optical line networks. Such an optical network can be connected to a port of an optical cross connector comprising a reconfigurable colorless reconfigurable optical add/drop multiplexer ROADM 1 according to the present invention. Each received optical signal is split by at least one optical splitter into split optical signals. In the shown embodiment of FIG. 1 the directionless and colorless reconfigurable optical add/drop multiplexer 1 comprises for each optical network a corresponding 1×R optical splitter which splits, the received optical signal from the optical network into a number R of split optical signals, i.e. generates copies of the channels from the respective line network. In the embodiment of FIG. 1 the directionless and colorless reconfigurable optical add/drop multiplexer 1 comprises M (1×R) optical splitters 3. In the embodiment of FIG. 1 each split optical signal is amplified by an optical amplifier 4-$i$ to compensate for the losses caused by the respective optical splitters 3-$i$. As can be seen from FIG. 1 for each of the R outputs of each 1×R optical splitter 3-$i$ a corresponding optical amplifier 4-$i$ is provided. Each amplified optical signal generated at an output of an 1×R optical splitter 3-$i$ is supplied to an input of a further passive 1×N optical splitter 5-$i$. In the embodiment shown in FIG. 1 the directionless and colorless reconfigurable optical add/drop multiplexer ROADM comprises M (1×N) passive optical splitters wherein N corresponds to the number of different clients. In the embodiment shown in FIG. 1 each of the optical line network signals is split into groups of R split optical signals. In the embodiment shown in FIG. 1 each optical signal from a line network passes through two consecutive optical splitters, i.e. a passive (1×R) optical splitter and a (1×N) optical splitter 5-$i$. In an alternative embodiment optical signals from the line networks passes only through one optical splitter such as the passive (1×N) optical splitter. In this embodiment the (1×R) optical splitter 3-$i$ are omitted. In the embodiment of FIG. 1 having two cascaded passive optical splitters 3-$i$, 5-$i$ the number of possible drops are increased by a factor R. Accordingly, the embodiment as shown in FIG. 1 allows for R×N drops. In the alternative embodiment having only M (1×N) optical splitters 5-$i$ the number of possible drops is N.

As can be seen from FIG. 1 the split optical signals provided by the passive optical splitters are applied to a downstream cross connector 6 distributing the split optical signals to wavelength selectors 7-$i$ of different clients. The downstream cross connector 6 can be formed by a passive device. In this embodiment the downstream connector 6 is a hardwired device for distributing the split optical signals to the wavelength selectors 7-$i$ of the different clients.

In an alternative embodiment the downstream cross connector 6 can also be formed by a programmable device such as a photonic cross connect switch.

In the embodiment shown in FIG. 1 the directionless and colorless reconfigurable optical add/drop multiplexer ROADM comprises N (M×1) wavelength selectors 7-$i$ of N different clients. Each wavelength selector 7-$i$ performs a wavelength selection of at least one wavelength from the distributed optical signals received from the downstream cross connector 6. The optical signal having a selected wavelength $\lambda$ is applied by the wavelength selector 7-$i$ to a client transponder 8-$i$ of a client. In the embodiment shown in FIG. 1 N client transponders of N clients are connected to a corresponding number of (M×1) wavelength selectors 7-$i$. The client transponder 8-$i$ can form a client transponder of a client terminal or of a client network. The wavelength selector 7-$i$ can be formed by a wavelength selected switch WSS. In a possible embodiment this wavelength selective switch WSS is a channelized wavelength selective switch WSS. This channelized wavelength selective switch comprises a fixed center frequency and a fixed passband bandwidth. This channelized wavelength selective switch can be customized at the factory and does not comprise a variable center frequency or a variable passband bandwidth which can be changed on demand by a user. In a preferred embodiment the wavelength selective switch 7-$i$ formed by a gridless wavelength selective switch having a variable granularity. This gridless wavelength selective switch 7-$i$ comprises a variable center frequency and a variable passband bandwidth which can be adapted on demand by means of a configuration interface.

Figure 2:
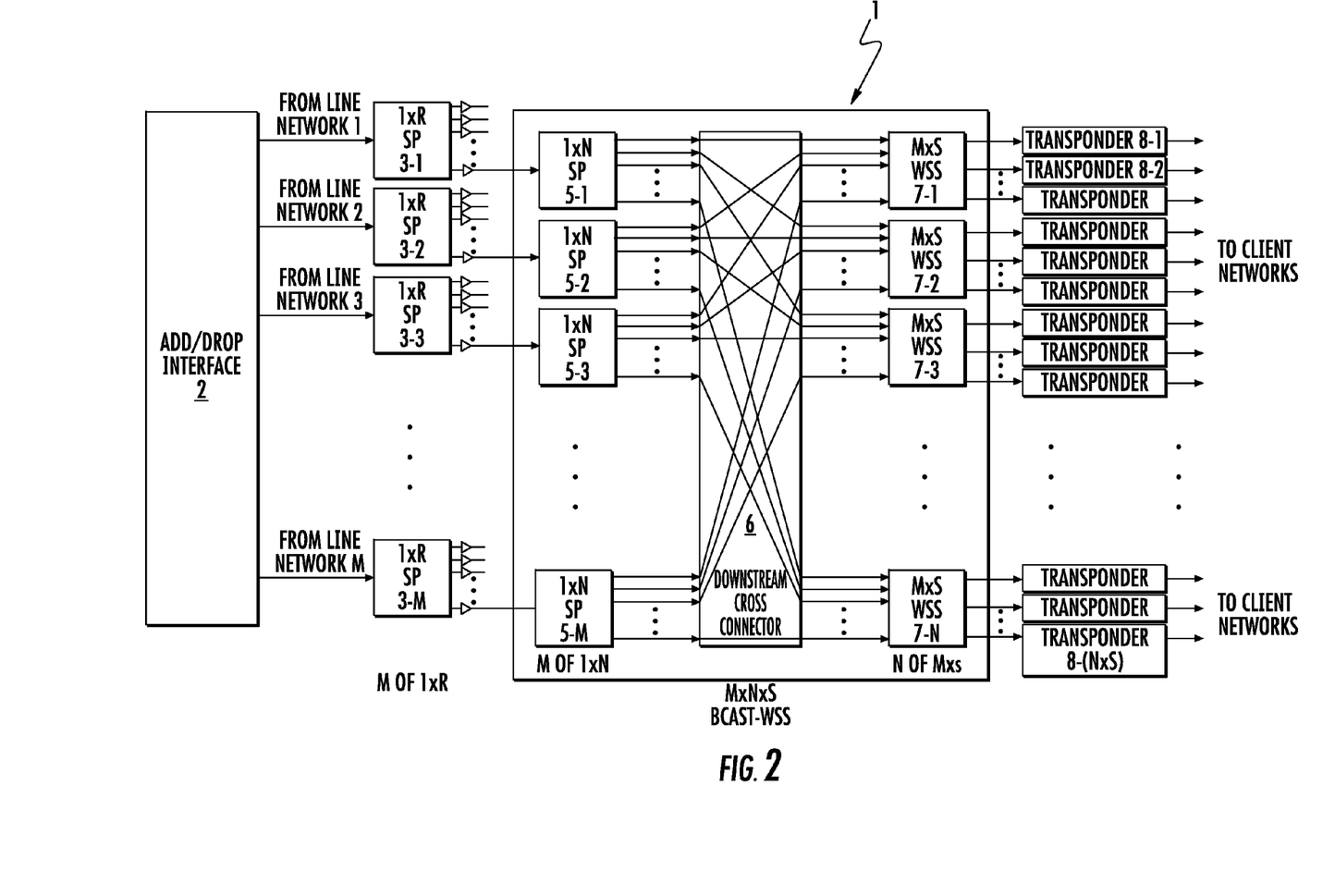
FIG. 2 shows a block diagram of a second further possible embodiment of the directionless and colorless reconfigurable optical add/drop multiplexer according to the present invention.

FIG. 2 shows a further possible embodiment of a directionless and colorless reconfigurable optical add/drop multiplexer ROADM 1 according to the present invention. In this embodiment the downstream cross connector 6 distributes the split optical signals to N (M×S) wavelength selectors 7-$i$ of (N×S) different clients. In this embodiment each (M×S) wavelength selector 7-$i$ is connected to several (S) client transponders 8-$i$ of a group of clients. In these embodiment the add/drop capacity of the directionless and colorless reconfigurable optical add/drop multiplexer (ROADM) 1 is increased by a factor (S). In the embodiment shown in FIG. 2 the number of possible drops is given by R×N×S. By increasing the S port count it is possible to lower the N port count number which will also lower the complexity and overall device insertion loss (i.e., when N=1 the cross connect and most except one W×S WSSs are eliminated).

Figure 3:
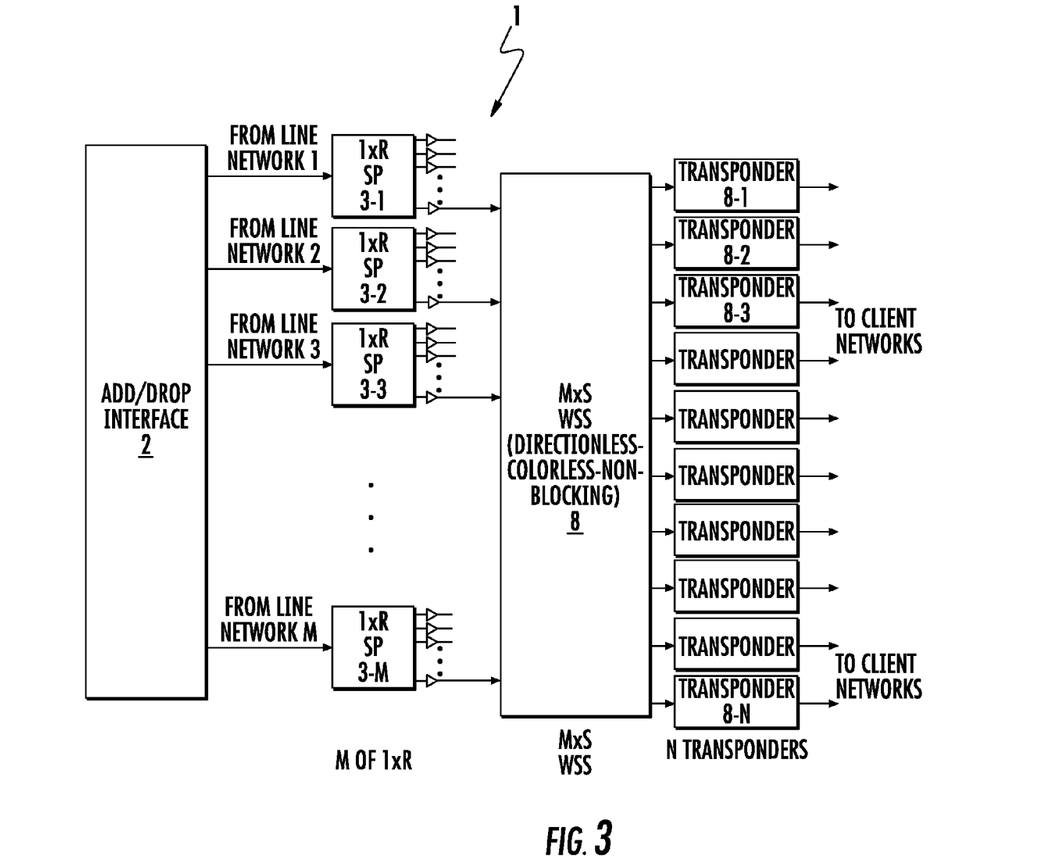
FIG. 3 shows a block diagram of a further possible embodiment of the directionless and colorless reconfigurable optical add/drop multiplexer according to the present invention.

FIG. 3 shows a further possible embodiment of a directionless and colorless reconfigurable optical add/drop multiplexer (ROADM) 1 according to the present invention. In this embodiment the directionless and colorless reconfigurable optical add/drop multiplexer (ROADM) 1 comprises at least one contentionless downstream (M×S) wavelength selective switch 8 provided for switching the split optical signals received from the (1×R) passive optical splitters 3-$i$ to client transponders 8-$i$ of N different clients. The (M×S) wavelength-selective switch 8 is contentionless. The wavelength-selective switch 8 allows that the same wavelength received from different line networks by means of the add/drop interface 2 can be added/dropped simultaneously and in any order on demand and without colliding thus avoiding a contention. In the embodiment of FIG. 2 by increasing the S port count and simultaneously lowering the N port count number the hardwired cross connector 6 can be omitted. The embodiment of FIG. 3 has the advantage that the complexity of the directionless and colorless reconfigurable optical add/drop multiplexer ROADM 1 can be reduced when compared to the embodiment of FIG. 2 thus simplifying the equipment. Furthermore, the necessary space for the equipment can be reduced. A further advantage of the embodiment shown in FIG. 3 is that lowering the insertion loss improves the performance and provides more power to the transponders 8-$i$. The contentionless downstream (M×S) wavelength-selective switch 8 is a preferred embodiment a directionless, colorless and non-blocking wavelength selective switch WSS. In the embodiment shown in FIG. 3 the colorless and directionless reconfigurable add/drop multiplexer ROADM 1 is provided in a network node and drops line network traffic coming from a number (M) of directions (M-degree). Each line is split into R groups and distributed to several (M×S) wavelength-selective switches. The number of channels or wavelengths, Nch, on each direction or line ranges from 1 to ninety-six or beyond. The desired channel from any line is dropped to the desired transponder port to be routed to the desired client network or client. The total number of wavelengths that can be dropped in the embodiment shown in FIG. 3 is R×S.

Figure 4:
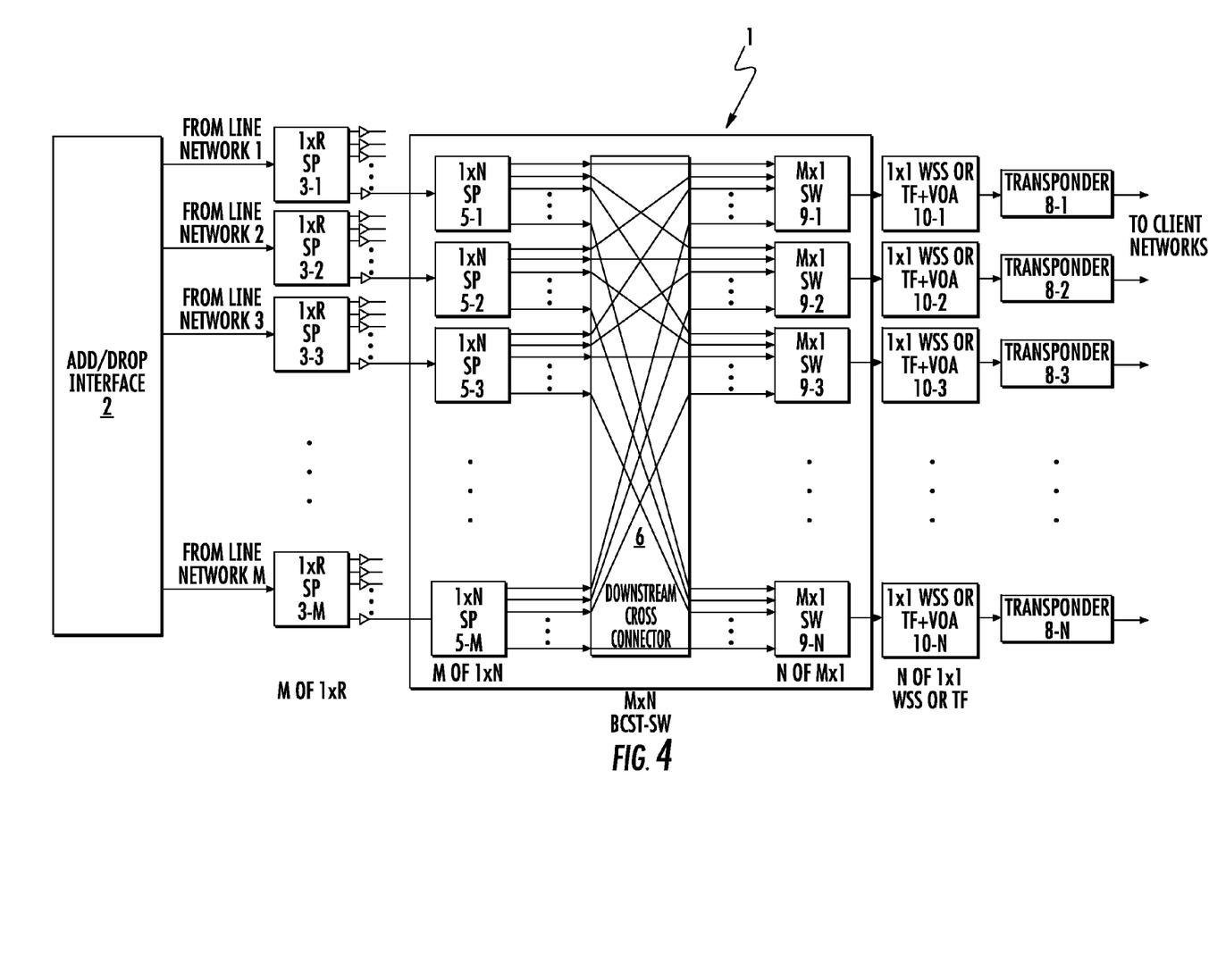
FIG. 4 shows a block diagram of a further possible embodiment of the directionless and colorless reconfigurable optical add/drop multiplexer according to the present invention.

FIG. 4 shows a further possible embodiment of a colorless and directionless reconfigurable add/drop multiplexer (ROADM) 1 according to the present invention. This ROADM 1 can also be implemented in a node and used to a drop line network traffic coming from a number (M) of directions (M-degree). Each line is split into R groups and distributed to a (M×N) downstream cross connector 6 distributing the split optical signals to wavelength selectors of different clients. The embodiment shown in FIG. 4 is similar to the embodiment of FIG. 1, however, instead of using N (M×1) wavelength selective switches 7-$i$ N (M×1) whitelight switches 9-$i$ are employed. Each (M×1) whitelight switch 9-$i$ is connected on its output side a further device 10-$i$. This device 10-$i$ can be formed in a possible embodiment by a (1×1) wavelength selective switch WSS. In an alternative embodiment the device 10-$i$ can be formed by a tunable filter. A tunable filter can comprise a liquid crystal filter, a thin film filter or a MEMS. Each tunable filter 10-$i$ is connected to a transponder 8-$i$ or a client or a client network. In the embodiment shown in FIG. 4 each line is split into R groups and distributed to broadcast and selective switches. A desired channel from any line is tuned and dropped to the desired transponder port to be routed to the desired client or client network. The total number of wavelengths that can be dropped in the embodiment shown in FIG. 4 is R×N.

For example, a 100% traffic drop requirement implies M×Nch=R×N. Thus, if M=4, Nch=96, N=16 then the split ratio is R=24, 12 or 6 for 100%, 50% or 25% traffic drop requirements, respectively.

FIGS. 1 to 4 show different embodiments of the drop signal path of a directionless and reconfigurable optical add/drop multiplexer ROADM 1 according to the present invention.

Figure 5:
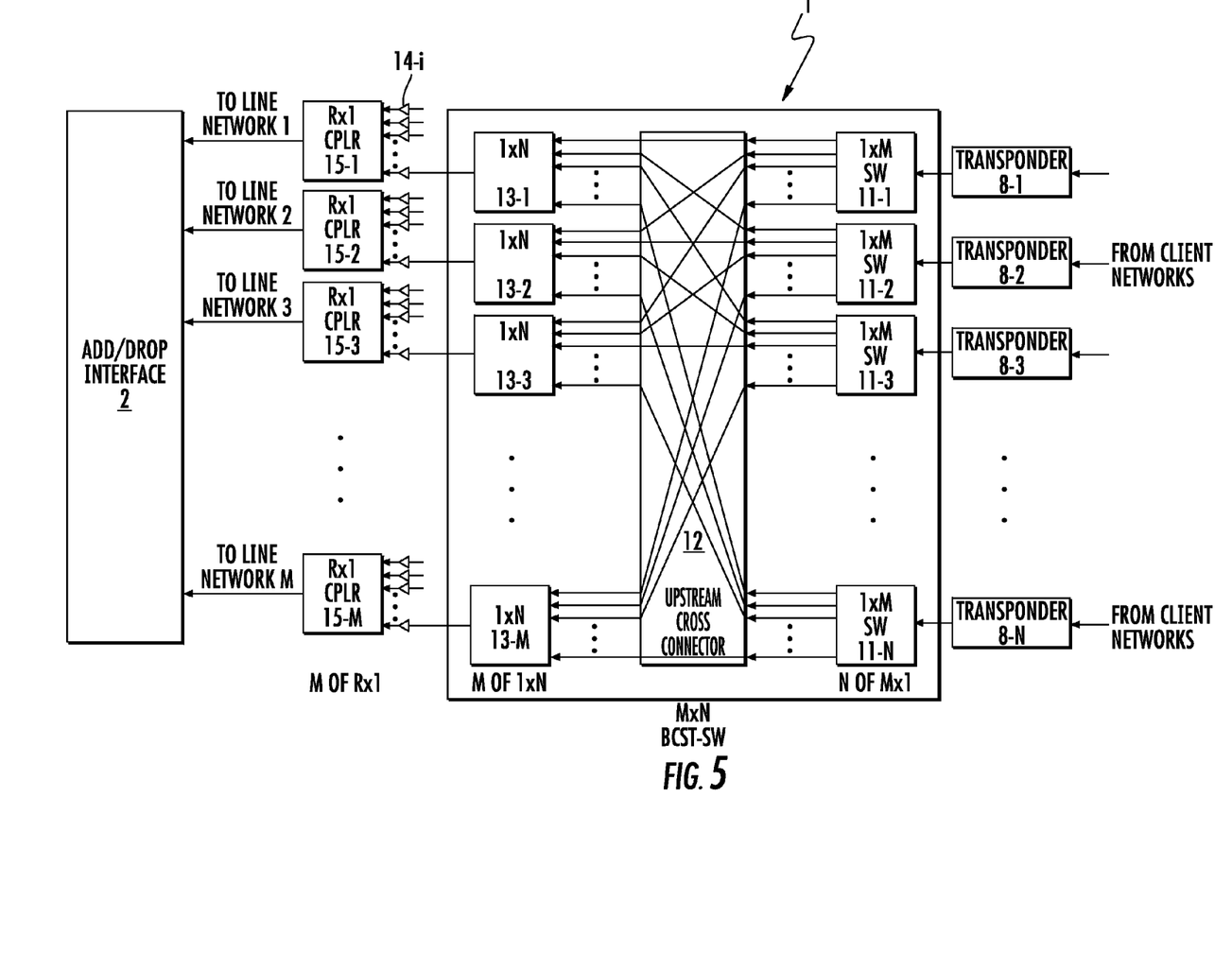
FIG. 5 shows a block diagram of a further possible embodiment of a directionless and colorless reconfigurable optical add/drop multiplexer according to the present invention.

FIG. 5 shows the add signal path of the ROADM 1 as can be seen from FIG. 5 each client transponder 8-$i$ is connected to a corresponding (1×M) optical switch 11-$i$ having an optical signal transmitted by the client transponder 8-$i$ to an upstream cross connector 12 distributing the transmitted optical signals to M optical combiners 13-$i$. In the embodiment shown in FIG. 5 there are provided N (1×M) optical switches 11-$i$ and M (1×N) optical combiners 13-$i$. In the embodiment shown in FIG. 5 the combined optical signals can be applied via optical amplifiers 14-$i$ to M (R×1) CPLR 15-$i$. In the embodiment of FIG. 5 there are provided M (R×1) CPLR 15-$i$ being connected to the add/drop interface 2 of the directionless and colorless reconfigurable optical add/drop multiplexer 1.

The colorless and directionless reconfigurable optical add/drop multiplexer 1 can be implemented in a node and can be used for adding client traffic using tunable transponders 8-$i$ and switches. The desired channel is tuned by the tunable transponder 8-$i$ to a desired wavelength and switched to the desired port to route the channel to a desired line network node.

The directionless and colorless reconfigurable optical add/drop multiplexer (ROADM) 1 according to the present invention is used to add and drop optical signals to a number (M) of directions of M line networks and can be implemented in a node of a degree M. The number M of optical networks connected to this node can vary. In a possible embodiment the number M of optical networks connected to the node comprising the ROADM 1 according to the present invention is within a range between one and eight optical networks (1≤M≤8). In possible embodiments more than eight optical networks can connected to the node comprising the ROADM 1 according to the present invention (M>8). The directionless and colorless reconfigurable optical add/drop multiplexer ROADM 1 according to the present invention can be provided for a predetermined number N of client transponders 8-$i$. This number N of client transponders can also vary. In a possible embodiment the number N of client transponders 8-$i$ is within a range of one to sixteen client transponders (1≤N≤16). In possible embodiments the number N of client transponders 8-$i$ connected to the add/drop multiplexer ROADM 1 according to the present invention can be even higher (N>16).

In a possible embodiment the optical signal can be transmitted in a predetermined frequency band FB. In a possible embodiment the frequency band FE ranges from 1528 nm and to 1568 nm. In an alternative embodiment the frequency band FB can be different.

Figure 6:
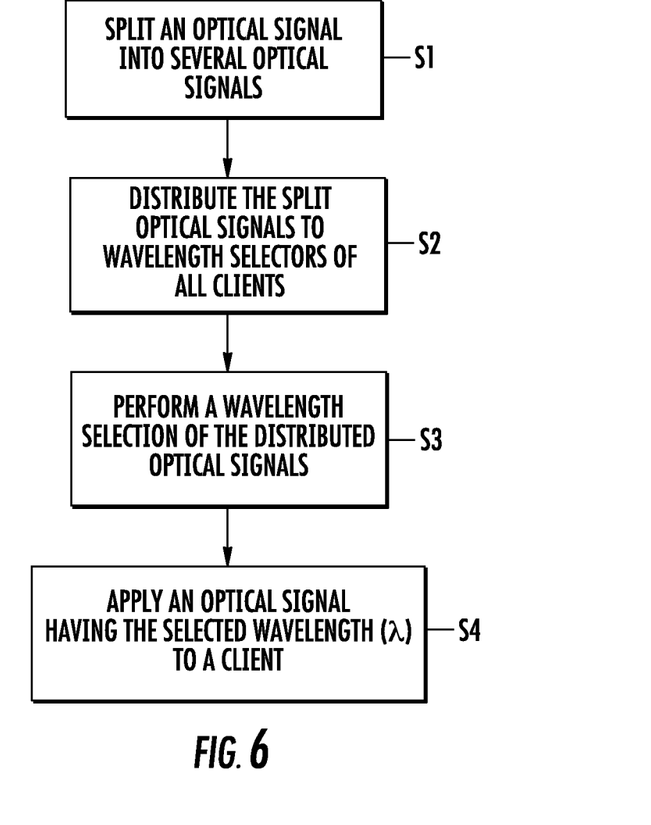
FIG. 6 shows a flowchart of a possible embodiment of a method for dropping an optical signal with a selectable wavelength at different clients according to the present invention.

FIG. 6 shows a flowchart of a possible embodiment of a method for dropping an optical signal with a selectable wavelength at different clients according to the present invention.

This method can be performed by using the directionless and colorless reconfigurable optical add/drop multiplexer ROADM 1 according to the present invention.

In a first step S1 a signal to be dropped is split into several optical signals. This can be performed by means of one or more passive optical splitters.

In a further step S2 the split optical signals are distributed to wavelength selectors of all clients. This distribution can be performed in a possible embodiment by a downstream cross connector. This downstream cross connector can be a hardwired downstream cross connector as shown in the embodiments of FIGS. 1, 2, 4 of the ROADM 1 according to the present invention. In an alternative embodiment the distribution of the split optical signals to wavelength selectors of all clients can be performed by means of a contentionless downstream wavelength selective switch as shown in the embodiment of FIG. 3.

In a further step S3 wavelength selection of the distributed optical signals is performed.

Finally in step S4 an optical signal having the selective wavelength λ is applied to a client or a client network. Accordingly, the present invention provides a method for dropping and adding data traffic to clients within a node having a reconfigurable degree nodes. These nodes are directionless nodes because they add and drop data traffic and can be configured to add/drop traffic to and from any direction without any wavelength contention thus being non-blocking. The directionless and colorless reconfigurable optical add/drop multiplexer ROADM 1 according to the present invention can be implemented in a M degree node. The directionless and colorless reconfigurable optical add/drop multiplexer ROADM 1 forms a M degree ROADM. The directionless and colorless reconfigurable optical add/drop multiplexer ROADM 1 according to the present invention can be implemented in a possible embodiment in an optical cross connecting node of an optical network. This optical network can be a wavelength division multiplexing WDM network. The directionless and colorless reconfigurable optical add/drop multiplexer ROADM 1 according to the present invention allows that any wavelength signal can be added and dropped to any network location. The directionless and colorless reconfigurable optical add/drop multiplexer ROADM 1 according to the present invention can comprise optical amplifiers for loss compensation. An add/drop port can be assigned to any wavelength and any wavelength can be coupled to any directions in a fully automated fashion. With the directionless and colorless reconfigurable optical add/drop multiplexer ROADM 1 according to the present invention it is possible to drop any wavelength or channel from any optical network to any transponder or client.

What is claimed is:

1. A directionless and colorless reconfigurable optical add/drop multiplexer (ROADM) for a plurality of clients, comprising:
an add/drop interface for optical signals of at least one optical network,
wherein each received optical signal is split by at least one optical splitter into optical signals which are applied to a downstream cross connector distributing the split optical signals to wavelength selectors of different clients,
wherein each wavelength selector performs a wavelength selection of at least one wavelength from the distributed optical signals,
wherein each wavelength selector comprises a wavelength selective switch, the wavelength selective switch comprising a grating filter and at least one of a liquid crystal on silicon switch (LCOS), a liquid crystal switch (LC), and a digital light processing switch (DLP),
wherein an optical signal having a selected wavelength ($\lambda$) is applied to at least a plurality of client transponders of the plurality of clients, and
wherein each client transponder is connected to a corresponding (1×M) optical switch switching an optical signal transmitted by said client transponder to an upstream cross connector distributing the transmitted optical signals to M optical combiners connected to said optical add/drop interface.

2. The directionless and colorless reconfigurable optical add/drop multiplexer (ROADM) according to claim 1,
wherein said optical add/drop interface is adapted to connect said ROADM to a number (M) of optical networks.

3. The directionless and colorless reconfigurable optical add/drop multiplexer (ROADM) according to claim 2,
wherein a plurality of M passive (1×R) optical splitters of said plurality of M optical networks are provided, each passive (1×R) optical splitter of said plurality of optical splitters being adapted to split an optical signal received from an optical network via said add/drop interface in R multiple copies of the optical signals, each (R) optical signal being applied to one of the plurality of M passive (1×N) optical splitters, each passive (1×N) optical splitter being adapted to split an optical signal received into N multiple copies of the optical signals applied to a (M×N) downstream cross connector, said downstream cross connector distributing the split optical signals to N (M×1) wavelength selectors of N different clients, wherein each (M×1) wavelength selector is connected to a corresponding client transponder of a client, or distributing the split optical signals to N(M×S) wavelength selectors of N×S different clients, wherein each (M×S) wavelength selector is connected to several (S) client transponders of a group of (N) clients.

4. The directionless and colorless reconfigurable optical add/drop multiplexer (ROADM) according to claim 3,
wherein said client comprises a client terminal or a client network.

5. The directionless and colorless reconfigurable optical add/drop multiplexer (ROADM) according to claim 1,
wherein an optical signal received by said add/drop interface is amplified by an optical amplifier to compensate for losses caused by the respective optical splitter.

6. The directionless and colorless reconfigurable optical add/drop multiplexer (ROADM) according to claim 1,
wherein the split optical signals split by an optical splitter are amplified by optical amplifiers to compensate for losses caused by said optical splitter.

7. The directionless and colorless reconfigurable optical add/drop multiplexer (ROADM) according to claim 1,
wherein said wavelength selector comprises a wavelength selective switch (WSS).

8. The directionless and colorless reconfigurable optical add/drop multiplexer (ROADM) according to claim 7,
wherein said wavelength-selective switch (WSS) is a channelized or gridless wavelength-selective switch having a variable granularity.

9. The directionless and colorless reconfigurable optical add/drop multiplexer (ROADM) according to claim 1,
wherein each wavelength selector comprises a (M×1) whitelight switch and a (1×1) wavelength-selective switch (WSS).

10. The directionless and colorless reconfigurable optical add/drop multiplexer (ROADM) according to claim 1,
wherein said downstream cross connector and said upstream cross connector are hardwired devices.

11. The directionless and colorless reconfigurable optical add/drop multiplexer (ROADM) according to claim 1,
wherein said downstream cross connector and said upstream cross connector are programmable devices.

12. The directionless and colorless reconfigurable optical add/drop multiplexer (ROADM) according to claim 1,
wherein the number (M) of optical networks is
within a range between one to eight.

13. The directionless and colorless reconfigurable optical add/drop multiplexer (ROADM) according to claim 1,
wherein the number (N) of client transponders is
within a range between one and sixteen.

14. The directionless and colorless reconfigurable optical add/drop multiplexer (ROADM) according to claim 1,
wherein the optical signal is transmitted in a predetermined frequency band between 1528 nm and 1568 nm or beyond.

15. A directionless and colorless reconfigurable optical add/drop multiplexer (ROADM) for a plurality of clients, comprising:
an add/drop interface for optical signals of at least one optical network,
wherein each optical signal is split by at least one optical splitter into optical signals which are applied to at least one contentionless downstream (M×S) wavelength selective switch switching the split optical signals to client transponders of S different clients of said plurality of clients,
wherein each client transponder is connected to a corresponding (1×M) optical switch switching an optical signal transmitted by said client transponder to an upstream cross connector distributing the transmitted optical signals to M optical combiners connected to said optical add/drop interface,
wherein each wavelength selective switch comprises a grating filter and at least one of a liquid crystal on silicon switch (LCOS), a liquid crystal switch (LC), and a digital light processing switch filter (DLP.

16. The directionless and colorless reconfigurable optical add/drop multiplexer (ROADM) according to claim 15,
wherein in the contentionless downstreams (M×S) wavelength selective switch is a directionless, colorless and non-blocking wavelength selective switch.

17. A method for dropping an optical signal with a selectable wavelength ($\lambda$) comprising:
splitting the optical signal into several optical signals;
distributing the split optical signals to wavelength selectors of all clients;

performing a wavelength selection of the distributed optical signals via a wavelength selector; and applying an optical signal having the selected wavelength ($\lambda$) to a client, wherein each of said plurality of clients comprises a client transponder; and wherein each client transponder is connected to a corresponding (1×M) optical switch switching an optical signal transmitted by said client transponder to an upstream cross connector distributing the transmitted optical signals to M optical combiners connected to said optical add/drop interface, and wherein said wavelength selector comprises a wavelength selective switch, the wavelength selective switch comprising a grating filter and at least one of a liquid crystal on silicon switch (LCOS), a liquid crystal switch (LC), and a digital light processing switch(DLP).

18. The directionless and colorless reconfigurable optical add/drop multiplexer (ROADM) according to claim 1, wherein the number (M) of optical networks is more than eight.

19. The directionless and colorless reconfigurable optical add/drop multiplexer (ROADM) according to claim 1, wherein the number (N) of client transponders is more than sixteen.

* * * * *